(12) United States Patent
Blevis et al.

(10) Patent No.: US 6,906,330 B2
(45) Date of Patent: Jun. 14, 2005

(54) GAMMA CAMERA

(75) Inventors: Ira Blevis, Zichron-Yaacov (IL);
Leonid Tsukerman, Kiryat-Motzkin (IL); Yaron Hefetz, Herzelia (IL)

(73) Assignee: Elgems Ltd., Tirat-Hacarmel (IL)

( * ) Notice: Subject to any disclaimer, the term of this patent is extended or adjusted under 35 U.S.C. 154(b) by 158 days.

(21) Appl. No.: 10/278,043

(22) Filed: Oct. 22, 2002

(65) Prior Publication Data

US 2004/0075058 A1 Apr. 22, 2004

(51) Int. Cl.$^7$ ............................................. G01T 1/24
(52) U.S. Cl. .................................................. 250/370.09
(58) Field of Search .................................. 250/370.09

(56) References Cited

U.S. PATENT DOCUMENTS

| | | | |
|---|---|---|---|
| 3,777,148 A | * 12/1973 | Miraldi | .................. 378/149 |
| 4,020,348 A | 4/1977 | Turcotte et al. | |
| 4,223,221 A | 9/1980 | Gambini et al. | |
| 4,245,646 A | 1/1981 | Ionnou et al. | |
| 4,672,207 A | 6/1987 | Derenzo | |
| 4,932,411 A | 6/1990 | Fritschy et al. | |
| 4,999,501 A | 3/1991 | Lacy | |
| 5,218,208 A | * 6/1993 | Augier et al. | .......... 250/363.02 |
| 5,429,133 A | 7/1995 | Thurston et al. | |
| 5,672,877 A | 9/1997 | Liebig et al. | |
| 5,682,888 A | 11/1997 | Olson et al. | |
| 5,732,704 A | 3/1998 | Thurston et al. | |
| 5,783,829 A | 7/1998 | Sealock et al. | |
| 5,813,985 A | 9/1998 | Carroll | |
| 5,844,241 A | 12/1998 | Liu et al. | |
| 5,871,013 A | 2/1999 | Wainer et al. | |
| 5,974,165 A | 10/1999 | Giger et al. | |
| 6,021,341 A | 2/2000 | Scibilia et al. | |
| 6,177,675 B1 | 1/2001 | Gagnon et al. | |
| 6,194,715 B1 | 2/2001 | Lingren et al. | |
| 6,207,958 B1 | 3/2001 | Giakos | |
| 6,242,744 B1 | 6/2001 | Soluri et al. | |
| 6,271,525 B1 | 8/2001 | Majewski et al. | |
| 6,628,984 B2 * | 9/2003 | Weinberg | ................... 600/436 |
| 6,635,879 B2 * | 10/2003 | Jimbo et al. | ........... 250/370.13 |

FOREIGN PATENT DOCUMENTS

WO    WO 98/23974    4/1998

* cited by examiner

*Primary Examiner*—Constantine Hannaher
(74) *Attorney, Agent, or Firm*—Fenster & Company

(57) ABSTRACT

A hand gamma camera system for generating an image of a gamma radiation source, said camera comprising a housing designed to be hand held, a gamma radiation image detector mounted on or in said housing that generates detection data responsive to radiation data from a gamma source incident on said radiation detector, a controller connected to said radiation detector that receives said detection data and generates image data and a display mounted on or in said housing that receives said image data from said controller and generates an image.

22 Claims, 1 Drawing Sheet

GAMMA CAMERA

FIELD OF THE INVENTION

The present invention relates to a hand gamma camera system.

BACKGROUND OF THE INVENTION

The injection of a radioisotope into a living body that concentrates in a tumor and is imaged to produce an image of a patient including the tumor is well known in the art. However, large-scale images of a tumor and its environment in the patient require large gamma cameras that are suitable for use prior to surgery but are not practical during surgery due to their size.

Olson et al. in U.S. Pat. No. 5,682,888 and Thurston et al. in U.S. Pat. No. 5,429,133 describe gamma probes that can be used during surgery to detect gamma radiation signals to grossly locate a tumor without providing an image.

Soluri et al. in U.S. Pat. No. 6,242,744 B1, Scibilia et al. in U.S. Pat. No. 6,021,341 and Thurston et al. in U.S. Pat. No. 5,732,704 describe hand-held gamma imaging detectors connected to remote image displays.

Gamma probes connected to a remote image display that are based on solid-state detectors are known and exemplified by a hand held pixelated detector of N. Wainer in U.S. patent application Ser. No. 09/378,871, assigned to Elgems, Inc., the disclosure of which is incorporated herein by reference.

SUMMARY OF THE INVENTION

In an aspect of an embodiment of the present invention, a hand gamma camera system comprising a gamma radiation detector responsive to gamma radiation, acquires radiation data from a gamma radiation-producing target within a biological tissue, for example a tumor and/or its sentinel nodes that have absorbed a radiation-producing material. In an exemplary embodiment a controller attached to said hand gamma system receives detection data provided by the radiation detector and generates image data that is received and displayed by a gamma image display.

In an exemplary embodiment, said gamma image display is attached to said controller. For the purposes of this application the word "attached", when referring to a component of said gamma camera system, for example the gamma image display of said gamma camera system, signifies a component that is physically connected to said camera in a fixed and/or moveable manner, for example with a pivot and/or arm. "Attached" further refers to said connection not consisting of only a wire and/or a remote connection.

Alternatively or additionally, said controller is remote from said housing, receiving said detection data from said radiation detector and/or transmitting said image data to said image display via a remote connection means.

For the purposes of this application the word "remote", when referring to a component of said gamma camera system, for example the controller of said gamma camera system, signifies a component that is connected to said camera by a wire and/or via a signal transmitted to and/or from a location that is remote from said camera.

In an exemplary embodiment, the radiation detector processes the radiation data generated by solid state detectors to provide detection data. Alternatively or additionally the radiation detector uses miniature PMT technology to provide detection data.

In an exemplary embodiment, the hand camera system is of a size and/or weight that is easy to hold and/or manipulate by an operator, optionally with a sterile gloved hand. Optionally the camera housing comprises a material that allows easy sterilization for repeated sterile use in an operating theater. Additionally or alternatively, the hand camera system is operable within a sterile sleeve that has a transparent area through which the image display is viewed.

In an exemplary embodiment of the present invention, a hand gamma camera system comprises a fixed focus collimator that focuses on the target tissue at a specific distance from the target. Moving the gamma camera to its focal point in relation to the target and subtracting its distance to the tissue surface provide depth information of the target below the tissue surface.

Additionally or alternatively, the gamma camera is equipped with a sensor that transmits information on the distance of the camera from the tissue surface. Optionally, the controller provides data on one or more of the following that are displayed on the camera data display; the distance between said gamma source and said tissue surface, said focal distance and the distance between said tissue surface and said gamma source.

In an exemplary embodiment of the present invention, the hand gamma camera system comprises one or more transponders, sensitive to one or more position and/or orientation transmitter/receivers, located for example, around the operating area. The one or more transponders provide position and/or orientation information to the controller that provides data to the camera display to thereby display position and/or orientation data.

In an exemplary embodiment, the gamma camera display provides an image in real time as the camera system is moved over said target. Optionally, the controller is operable to provide image data to said display at a resolution that is responsive to the motion of said camera in relation to said tissue. For example, when the camera is moved at a fast velocity, said controller provides an image at a low resolution and when the camera is moved at a slow velocity, said controller provides an image at low resolution to said display.

In an exemplary embodiment, the gamma camera comprises hand and/or finger-operated controls that control, for example, image resolution, depth, and position and/or orientation information. Additionally or alternatively, the gamma camera comprises foot-operated controls operable by a sterile and/or non-sterile person and/or controls remote from the gamma camera that are operable by an assistant that provide image resolution, depth, position and/or orientation information.

Alternatively or additionally, the gamma camera provides images to a remote screen in a non-sterile area of the operating theater for viewing. Alternatively or additionally, the gamma camera system comprises a self-contained power supply.

In an aspect of an embodiment of the present invention, a gamma detector comprising a gamma radiation detector responsive to gamma radiation, acquires radiation data through a fixed focus collimator having a predetermined focal distance from a gamma radiation-producing target within a three-dimensional body having a surface.

In an exemplary embodiment of the present invention, the detector is moved to its focal point in relation to the target and the distance of its collimator and/or radiation detector to the tissue surface is determined and subtracted from its focal length, thereby providing depth information of the target below the tissue surface.

There is thus provided a hand gamma camera system for generating an image of a gamma radiation source, said camera comprising a housing designed to be band held, a gamma radiation image detector mounted on or in said housing that generates detection data responsive to radiation data from a gamma source incident on said radiation detector, a controller that receives said detection data and generates image data and a display mounted on or in said housing that receives said image data from said controller and generates an image. Optionally, said controller is in or on said housing. Alternatively, said controller is remote from said housing.

Optionally, said camera comprises a fixed focus collimator having a predetermined focal distance that focuses the gamma camera image substantially at the focal distance from the gamma camera. Optionally, said source is located within a three-dimensional body with a surface and said camera comprises a transducer that senses the distance of said camera in relation to said surface.

In an exemplary embodiment, said controller is responsive to said transducer and provides at least one of the following distances on said display; the camera focal length, the distance between said gamma source and said tissue surface and the distance of said camera in relation to said surface. Optionally, an operator-operated distance control causes said display to display at least one of said distances. Optionally, the camera is provided with a self-contained power supply that supplies power to said camera. Optionally, said display provides an image in real time. Alternatively, said controller is operable to provide image data at a plurality of resolutions to said display.

In an exemplary embodiment, an operator-operated resolution control controls said image data resolution provided by said controller to said display. Optionally, said camera comprises a position transponder that provides position data of said camera, to said display. Optionally, the position transponder provides orientation data of said camera, to said display.

In an exemplary embodiment, an operator-operated control on said housing causes said position transponder to provide at least one of said position information and orientation information to said display. Optionally, the operator-operated controls are attached to said camera. Alternatively, the operator-operated controls are remote from said camera.

In an exemplary embodiment, said image detector comprises solid state circuit radiation detectors. Alternatively, said image detector comprises miniature PMT's.

Optionally, said display is adapted to move in relation to said housing. Optionally, a handle extending from said housing. Optionally, said camera comprises a moveable articulation between said handle and said housing.

There is thus further provided a gamma detection system apparatus comprising a controller, a gamma radiation imaging detector that provides image data to the controller, said data being detected from a gamma radiation source within a body having a surface, a fixed focus collimator having a predetermined focal distance through which the detector views the gamma source and a transducer that determines the distance of said detector or collimator from said surface and generates distance data to said controller.

Optionally, at least said detector is adapted to be held in a hand. Alternatively or additionally, at least said detector is adapted to be portable.

Optionally at least one display is connected to said controller. Optionally, said at least one display is mounted on said detector. Alternatively, said at least one display is separate from said detector.

In an exemplary embodiment, said at least one display displays at least one of the following; the camera focal length, the distance between said gamma source and said tissue surface and the distance of said camera in relation to said surface.

Optionally, an operator-operated control causes said at least one display to display at least one of said distances. Optionally, said operator-operated control is attached to said detector. Alternatively, said operator-operated control is remote from said detector.

There is thus provided a method of gamma-radiation imaging, comprising imaging a region containing gamma-emitting material using a gamma radiation detector through a fixed focus collimator having a fixed focal length, providing said image on a display, moving said detector closer to, or further from, said material until said image fills said display, determining the distance of the detector to a surface enclosing said material and calculating the distance of said gamma-emitting material from said surface, based upon said determined distance and said focal length.

Optionally, said calculating comprises subtracting said measured distance from the focal distance associated with said fixed focus collimator. Optionally, said determining comprises sending and receiving a signal to and from said enclosing surface. Optionally, said distance determination is displayed on said display.

In an exemplary embodiment, imaging comprises determining the velocity of said detector in relation to said gamma emitting material, processing said image information to provide adjusted image data at a pixel resolution that maximizes features of said image, consonant with said velocity and displaying an image of gamma emitting material based on said adjusted image data at said pixel resolution on said display.

BRIEF DESCRIPTION OF THE DRAWINGS

Exemplary non-limiting embodiments of the invention are described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DESCRIPTION OF EXEMPLARY EMBODIMENTS

Figure 1:
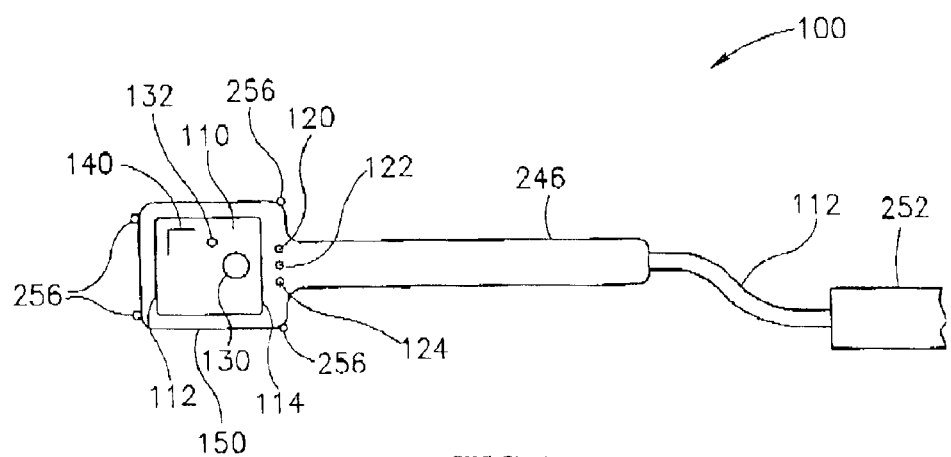
FIG. 1 is a top view of a hand gamma camera system, in accordance with an embodiment of the present invention.

FIG. 1 is a top view of a gamma camera system 100 comprising a housing 150 with an attached display 110 that fits in the hand of an operator, for example a surgeon during surgery, in accordance with an embodiment of the present invention.

Figure 2:
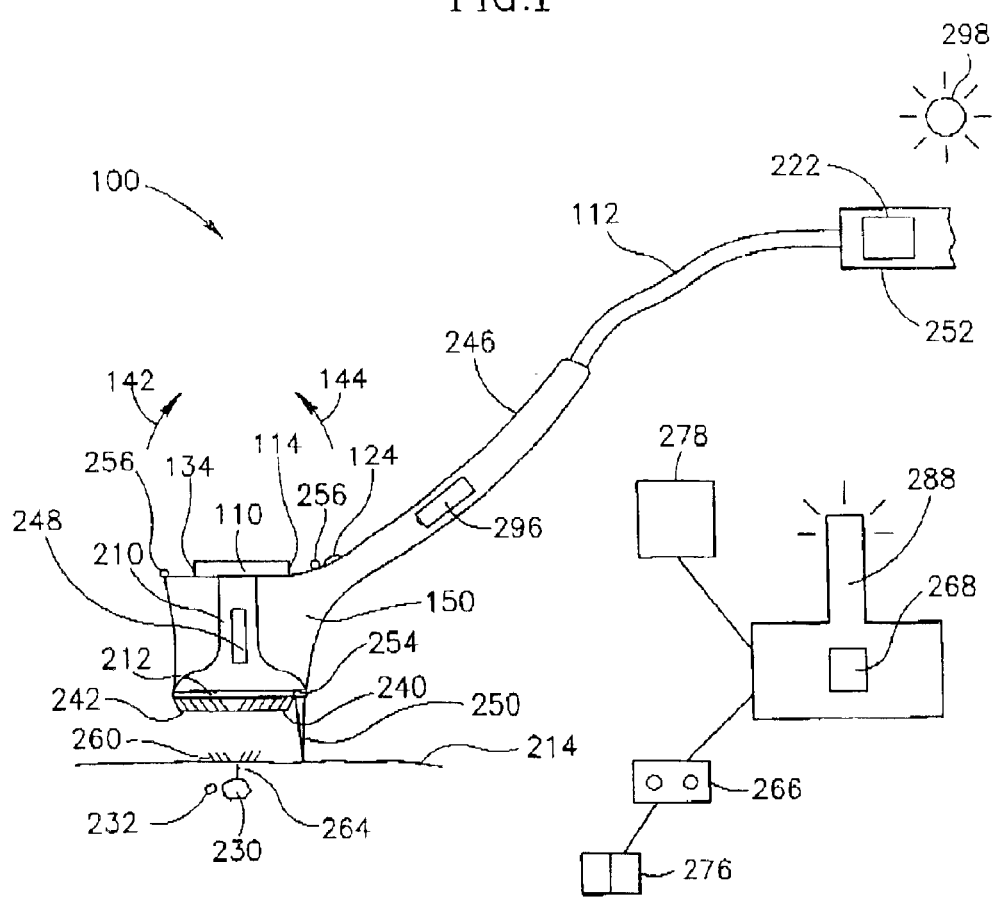
FIG. 2 is a side view of the hand gamma camera system of FIG. 1, in accordance with an embodiment of the present invention.

FIG. 2 is a side view of gamma camera system 100. In an exemplary embodiment, a gamma-emitting material is introduced into a target tissue, for example a tumor 230 and/or a sentinel node 232 to produce gamma radiation 260. In an exemplary embodiment, a gamma acquisition area 212 is held near a tissue surface 214, for example within 10 centimeters or less to tissue surface 214. Gamma radiation data 260 passes through acquisition area 212 and is detected by a solid state pixelated radiation detector 210 responsive to radiation data 260. Pixelated detector 210 provides detection data to a controller 248 that is operable with display 110 to provide a tumor image 130 and/or a sentinel node image 132 (FIG. 1).

An exemplary embodiment of solid state pixelated radiation detector 210 is described in PCT publication WO 98/23974, the disclosure of which is incorporated herein by reference. Alternatively or additionally, gamma camera system 100 utilizes an alternative to solid state pixelated detector 210, for example a plurality of Photo Multiplier Tubes (PMT's).

In an exemplary embodiment, camera system 100 has an onboard antenna 112 that is, for example 6 centimeter or less in length and/or otherwise designed to allow free movement of camera system 100 in a surgical field. Optionally, onboard antenna 112 transmits and/or receives data to and/or from a remote signal transmitter/receiver 288 using any one of a variety of remote signal communication systems that are known in the art.

In an exemplary embodiment, transmitter/receiver 288 is connected to a remote controller 268 that processes the detection data and provides image data that is transmitted, for example, back to camera system 100 and displayed on image display 110. Additionally, remote controller 268 transmits image data to a remote monitor 278 to which it is connected. Alternatively, the controller is on board the hand held detector.

In an exemplary embodiment, gamma acquisition area 212 comprises fixed collimator blades 240 that converge toward fixed collimator blades 242, providing a fixed focus for gamma radiation 260 in relation to tumor 230 and/or node 232. Gamma camera system 100, for example, is moved nearer to, and/or farther from tissue surface 214 along a Z-axis, referring to a distance-defining axis between camera system 100 and tumor 230. When tumor image 130 fills display 110, the operator is apprised that tumor 230 is positioned at the focal distance of gamma camera 100.

In an exemplary embodiment, the operator measures the distance of gamma camera system 100 from tissue surface 214 and subtracts it from the fixed focus distance of camera system 100 to calculate a depth 264 of tumor 230, below tissue surface 214.

In an exemplary embodiment, gamma camera system 100 is equipped with a transducer 254 that sends and receives, for example, an ultrasound, laser and/or another beam 250 onto tissue surface 214 and provides depth information to controller 248 that provides depth 264 that is displayed on a data display area 140 of display 110.

In an exemplary embodiment, display 110 provides one or more of: the fixed focus distance of camera system 100, depth 264 of tumor 230 below tissue surface 214 or the distance of skin surface 214 to camera system 100.

In an exemplary embodiment, camera system 100 provides a real-time image of and/or depth 264 of tumor 230 prior to, during and/or following surgical excision. For example, before tumor 230 is removed, tumor 230 is imaged. After removal of tumor 230 and/or a portion thereof, additional images of tumor 230 are taken to capture an image of any tumor 230 remaining, along with for example, a reading on depth 264 as a location guide. Further surgical excision is carried out until tumor image 130 demonstrates no further remaining tumor 230, providing a valuable real-time excision progress indicator for the operator and/or surgeon.

It may be desirable for the operator to acquire different tumor image 130 resolutions on display 110. In an exemplary embodiment, a rough image is formed rapidly without burdening controller 248 allowing the operator to view tumor image 130 with gross details. Following this, the operator hones in on tumor 230 and display 110 provides a finer resolution tumor image 130 that provides the operator with greater detail of tumor 230.

In an exemplary embodiment, camera system 100 may display a low and/or high resolution tumor image 130 and/or sentinel node image 132 automatically, for example, based upon the velocity of camera system 100 as sensed by transducer 254. Alternatively or additionally, controller 248 recognizes the boundaries of an object, for example the boundaries of tumor image 130. In an exemplary embodiment, camera system 100 automatically senses the velocity of gamma camera system 100 in relation to the object and adjusts the resolution of tumor image 130 and/or display 110 accordingly.

Additionally or alternatively, a user-operated resolution control 122 directs camera 100 to acquire the image at low or high pixel image resolutions. Alternatively or additionally, a variety of velocity detection systems known in the art provide motion information and gamma camera system 100 could incorporate any one of these systems.

In an exemplary embodiment, a low pixel resolution of 0.8 mm or more is acquired when camera system 100 moves rapidly across the surgical field to provide rough tumor image 130. A higher resolution of 0.8 mm or less is acquired when camera system 100 moves more slowly across the surgical field. Alternatively or additionally, gamma camera system 100 provides a multiplicity of image resolutions on display 110 responsive to the motion of camera 100 in relation to skin surface 214.

In an exemplary embodiment, display 110 can be rotated in relation to housing 150. For example, an edge 134 of display 110 can be moved in direction 142 and/or an edge 114 can be moved in a direction 144 to allow the operator to view screen 110 in a variety of positions to enhance viewing. In an exemplary embodiment, display 110 is, for example, round or rectangular, the shape of display 110 being dependent, for example, on the type of tumor to be examined and/or ergonomic considerations. In an exemplary embodiment, display 110, whether round or rectangular for example, has dimensions of between 2 and 20 centimeters (optionally more than 20 centimeters or less than 2 centimeters) dependent upon, for example, the size of tumor 230 being located.

In an exemplary embodiment controller 248 provides position and/or orientation data to display 110 that displays it on data display area 140. In an exemplary embodiment, one or more position and/or orientation transmitters/receivers 298 for example, that are located around the surgical area provide position and/or orientation information to one or more transponders 256 that are connected to controller 248.

Optionally, by pressing a user-operated position control 124, for example, controller 248 provides position on display 110. Alternatively or additionally, by pressing a user-operated orientation control 120, controller 248 provides orientation information on display 110. Alternatively or additionally, controller 248 automatically provides position and/or orientation data from position transponders 256 on display 110. Additionally or alternatively, a variety of systems are known in the art that provide position and/or orientation information and gamma camera system 100 could incorporate any one of these systems.

In an exemplary embodiment, a hand-held gamma camera system 100 weighs between 200 and 2000 grams, dependent, for example, on the size of display 110. Alternatively, gamma camera 100 is mounted on a movement assistance device, for example a weighted arm, often referred to as a boom. When gamma camera 100 is mounted on a boom, for example, gamma camera 100 may weigh between 1000 and 10,000 grams (optionally more than 10,000 or less than 1000 grams) depending, for example, upon the design, materials and/or size of display 110.

In an exemplary embodiment, gamma camera system 100 has a handle 246 of a length that does not substantially hinder motion in a surgical field, for example between 4 and 20 centimeters in length. Alternatively, handle 246 is 4 centimeters or shorter or 20 centimeters or longer, dependent for example, upon camera system 100 weight and/or ergonomic design.

In an exemplary embodiment, handle 246 is attached to housing 150 with an articulation that is optionally moveable so that gamma camera housing 150 and/or display 110 can be manipulated easily in relation to tumor 230 while handle 246 is held relatively stationary by the operator.

In an exemplary embodiment, gamma camera system 100 has a self-contained power supply 296, for example, a rechargeable battery. Alternatively or additionally, gamma camera system 100 is connected to a separate power supply (not shown).

In an exemplary embodiment, remote hand controls 266 and/or foot controls 276 communicate with gamma camera system 100, for example, via onboard antenna 112.

Optionally gamma camera 100 comprises materials that are, for example, electrically insulated so that camera 100 may contact liquids in the operating field without danger to the operator or camera 100. Alternatively or additionally, gamma camera 100 comprises materials that tolerate autoclave sterilization and/or chemical sterlization, optionally on a repeated basis, so that gamma camera 100 can be handled by a sterile operate on one or more occasions, for example in the operating theater.

In an exemplary embodiment, camera housing 150 comprises one or more materials, for example, titanium, aluminum and/or steel.

Additionally or alternatively, camera system 100 is operable without sterilization, for example, being operable in a sterile environment when placed within a sterile sleeve 252, shown prior to being placed fully around gamma camera system 100. Optionally, sterile sleeve 252 has a transparent area 222, for example, made of a transparent polymer, through which display 110 is readily observed. Optionally, sterile sleeve 252 is made of a material that allows repeated sterilization for multiple usage, for example a clear heat-resistant polymer, for example, of a type commonly used in operating room sterile wrappings. Additionally or alternatively, sterile sleeve 252 comprises a disposable material that is discarded following a single use.

In an exemplary embodiment of the present invention, hand gamma camera 100 comprises a detector 100 having a gamma radiation detector 210 that acquires radiation data through fixed focus collimator blades 240 and 242 having a predetermined focal distance to tumor 230 and/or another gamma emitting tissue. In some embodiments, gamma detector 100 is lager than a size suitable for holding in a hand and, for example, comprises detector 210 and collimator blades 240 and 242 that are mounted on a moveable gantry. Said gantry, for example, moves so that detector 100 is positioned above tumor 230 and separated from tumor 230 by the predetermined focal distance. In other embodiments, detector 100 is hand held.

In an exemplary embodiment of the present invention, after detector 100 is moved to its focal point in relation to tumor 230, distance 250 is determined. Optionally distance 250 to tissue surface 214 comprises the distance of detector 100, collimator blades 240 and 242 and/or detector 210 to tissue surface 214. Distance 250 is determined, for example by measuring with a ruler or an alternative measuring device. Distance 250 is then subtracted from the focal length of detector 100, thereby providing depth 264 of tumor 230 below tissue surface 214.

Optionally, distance 250 is provided by a distance measuring transducer, for example that is mounted on detector 100. Alternatively or additionally, display 110 associated with detector 100, for example mounted on detector 100 or remote from detector 100, displays said depth 264 of tumor 230.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. For example, while gamma camera system 100 has been described in relation to acquiring gamma data from a biological source, it is within the scope of this invention for gamma camera to provide gamma data from an inanimate object, locating for example hidden radioactive materials, shrapnel and/or weapons.

Furthermore, the terms "comprise," "include," "have" and their conjugates, shall mean, when used in the disclosure and/or claims, "including but not necessarily limited to."

It is noted that some of the above described embodiments way describe the best mode contemplated by the inventors and therefore may include structure, acts or details of structures and acts that may not be essential to the invention and which are described as examples. Structure and acts described herein are replaceable by equivalents, which perform the same function, even if the structure or acts are different, as known in the art. Therefore, the scope of the invention is limited only by the elements and limitations as used in the claims.

What is claimed is:

1. A hand gamma camera system for generating an image of a gamma radiation source, said camera comprising:

(a) a housing having a handle;

(b) a gamma radiation image detector mounted on or in said housing that generates detection data responsive to radiation data from a gamma source incident on said radiation detector;

(c) a controller that receives said detection data and generates image data; and (d) a display mounted on or in said housing that receives said image data from said controller and generates an image;

wherein said camera further comprises a fixed focus collimator having a predetermined focal distance that focuses the gamma camera image substantially at the focal distance from the gamma camera; and wherein said source is located within a three-dimensional body with a surface and said camera comprises a transducer that senses the distance of said camera in relation to said surface.

2. A gamma camera according to claim 1, wherein said controller is responsive to said transducer and provides at least one of the following distance on said display;

the camera focal length;

the distance between said gamma source and said tissue surface; and the distance of said camera in relation to said surface.

3. A gamma camera according to claim 2 wherein an operator-operated distance control causes said display to display at least one of said distances.

4. A gamma camera according to claim 3 wherein said operator-operated control is attached to said camera.

5. A gamma camera according to claim 3 wherein said operator-operated control is remote from said camera.

6. A gamma detection system apparatus comprising:

a) a controller b) a gamma radiation imaging detector that provides image data to the controller, said data being detected from a gamma radiation source within a body having a surface;

c) a fixed focus collimator having a predetermined focal distance through which the detector views the gamma source; and d) a transducer that determines the distance of said detector or collimator from said surface and generates distance data to said controller.

7. A gamma detection apparatus according to claim 6 wherein at least said detector is adapted to be held in a hand.

8. A gamma detection apparatus according to claim 6 wherein at least said detector is adapted to be portable.

9. A gamma detection apparatus according to claim 6 wherein at least one display is connected to said controller.

10. A gamma detection apparatus according to claim 9 wherein said at least one display is mounted on said detector.

11. A gamma detection apparatus according to claim 9 wherein said at least one display is separate from said detector.

12. A gamma detection apparatus according to claim 9 wherein said at least one display displays at least one of the following:

the camera focal length;

the distance between said gamma source and said tissue surface; and the distance of said camera in relation to said surface.

13. A gamma detection apparatus according to claim 12 wherein an operator-operated control causes said at least one display to display at least one of said distances.

14. A gamma detection apparatus according to claim 13 wherein said operator-operated control is attached to said detector.

15. A gamma detection apparatus according to claim 13 wherein said operator-operated control is remote from said detector.

16. Apparatus according to claim 6 wherein the transducer measures the distance of said detector or collimator from said surface.

17. A method of gamma-radiation imaging comprising:

(a) imaging a region containing gamma-emitting material using a gamma radiation detector through a fixed focus collimator having a fixed focal length;

(b) providing said image on a display;

(c) moving said detector closer to, or further from, said material until said image fills said display;

d) determining the distance of the detector to a surface enclosing said material when said image fills said display; and e) calculating the distance of said gamma-emitting material from said surface, based upon said determined distance and said focal length.

18. A method of gamma-radiation imaging according to claim 17, wherein said calculating comprises subtracting said determined distance from the focal distance associated with said fixed focus collimator.

19. A method of gamma-radiation imaging according to claim 17, wherein said determining comprises sending and receiving a signal to and from said enclosing surface.

20. A method of gamma-radiation imaging according to claim 17, wherein said distance determination is displayed said display.

21. A method of gamma radiation imaging according to claim 17, comprising:

(a) determining the velocity of said detector in relation to said gamma emitting material;

(b) processing said image information to provide adjusted image data at a pixel resolution that maximizes features of said image, consonant with said velocity; and (c) displaying an image of gamma emitting material based on said adjusted image data at said pixel resolution on said display.

22. A method according to claim 17 wherein determining the distance comprises measuring the distance.

* * * * *